US007198471B2

(12) United States Patent
Gunneskov et al.

(10) Patent No.: US 7,198,471 B2
(45) Date of Patent: Apr. 3, 2007

(54) WIND TURBINE BLADE

(75) Inventors: Ole Gunneskov, Hadsten (DK); Nicholas Dudley Barlow, Southampton (GB); Mark Hancock, Southampton (GB); Tomas Vronsky, Southampton (GB)

(73) Assignee: NEG Micon A/S, Randers (DK)

( * ) Notice: Subject to any disclaimer, the term of this patent is extended or adjusted under 35 U.S.C. 154(b) by 0 days.

(21) Appl. No.: 10/483,963

(22) PCT Filed: Jul. 19, 2002

(86) PCT No.: PCT/DK02/00506

§ 371 (c)(1),
(2), (4) Date: Aug. 13, 2004

(87) PCT Pub. No.: WO03/008800

PCT Pub. Date: Jan. 30, 2003

(65) Prior Publication Data

US 2004/0253114 A1 Dec. 16, 2004

(30) Foreign Application Priority Data

Jul. 19, 2001 (DK) ............................... 2001 01125
Feb. 1, 2002 (GB) ............................... 0202401.6

(51) Int. Cl.
*F01D 5/12* (2006.01)
*F01D 5/14* (2006.01)

(52) U.S. Cl. ................................ 416/229 R; 416/230

(58) Field of Classification Search ............ 416/229 R, 416/230, 232; 144/345, 346, 349, 350, 352; 156/222–245, 154, 580, 581, 583.3
See application file for complete search history.

(56) References Cited

U.S. PATENT DOCUMENTS 2,293,224 A * 8/1942 Heinrich ..................... 416/230

(Continued)

FOREIGN PATENT DOCUMENTS

CA       1341340       2/2002

(Continued)

OTHER PUBLICATIONS

European Search Report dated Feb. 8, 2005.

(Continued)

*Primary Examiner*—Igor Kershteyn
(74) *Attorney, Agent, or Firm*—Harness, Dickey & Pierce, P.L.C.

(57) ABSTRACT

The invention relates to a wind turbine blade comprising a number of pre-fabricated strips arranged in a sequence along the outer periphery. The strips consist of a fibrous composite material, preferably carbon fibres, and consist of a wooden material, preferably plywood or wooden fibres held in a cured resin. The advantage is that it is possible to manufacture blades for wind turbines which are very stiff and generally have a high strength, but which nevertheless are easy to manufacture and also is much cheaper to manufacture compared to conventional manufacturing techniques. The invention also relates to methods for manufacturing prefabricated strips and for manufacturing wind turbine blades.

33 Claims, 3 Drawing Sheets

U.S. PATENT DOCUMENTS

| | | | |
|---|---|---|---|
| 2,589,316 A * | 3/1952 | Young | 156/263 |
| 4,077,740 A | 3/1978 | Sobey | |
| 4,087,450 A | 5/1978 | Pierce | |
| 4,389,162 A | 6/1983 | Doellinger et al. | |
| 4,474,536 A | 10/1984 | Gougeon et al. | |
| 4,597,715 A * | 7/1986 | Coleman | 416/229 R |
| 4,627,791 A * | 12/1986 | Marshall | 416/132 R |
| 4,643,647 A | 2/1987 | Perry | |
| 4,902,215 A | 2/1990 | Seemann, III | |
| 4,976,587 A | 12/1990 | Johnston et al. | |
| 5,375,324 A | 12/1994 | Wallace et al. | |
| 5,499,904 A | 3/1996 | Wallace et al. | |
| 6,056,838 A | 5/2000 | Besse et al. | |

FOREIGN PATENT DOCUMENTS

| | | | |
|---|---|---|---|
| EP | 0718495 A1 | 12/1995 | |
| GB | 706800 | 4/1954 | |
| GB | 706800 | 7/1954 | |
| WO | WO 93/05888 | 4/1933 | |
| WO | WO 96/07825 | 3/1996 | |
| WO | WO 01/33075 A1 | 5/2001 | |

OTHER PUBLICATIONS

American Institute of Aeronautics and Astronautics, A98-25222, "Design and Manufacture of Low-Cost Composite-Bonded Wing", Timothy C. Anderson and Richard C. Holzwarth, AIAA-98-1870, pp. 2199-2209.

1996 MSC World User's Conference Proceedings Newport Beach, CA, Jun. 3-7, 1996, "Evaluation of an Analytical Design Tool for Ballistic Dynamics Simulation", Asish K. Sareen, Michael R. Smith, Bell Helicopter Textron, Inc., © 1996 by the American Helicopter Society.

Composite Fabrication, Sep. 2001: "Alternative Approaches to Closed Molding Infusion", pp. 56-59.

"WINDKRAFTANLAGEN", Erich Hau, Springer, 2. Auflage, 1995.

"Advanced Composites in Civil Engineering in Europe", Dr. Chris J. Burgoyne, University of Cambridge, Cambridge, UK. Structural Engineering International Apr. 1999, published Apr. 1996.

Notice of Opposition dated Jan. 27, 2006 (listing 11 references).

Notice of Opposition dated Jan. 27, 2006 (listing 2 references).

* cited by examiner

WIND TURBINE BLADE

The present invention relates to a blade for wind turbines, in which blade the periphery layer of the cross section of the blade

BACKGROUND OF THE INVENTION

Wind turbine blades are today manufactured comprising a bearing central inner beam, commonly of a hollow, square cross-section and made from a glass fibre and resin composite, surrounded with two shells forming the upper and the lower outer surface of the blade and determining the aerodynamic properties thereof.

The shells may be of a single layer or at least along a part of the circumference be a sandwich construction comprising two parallel layers of glass fibres and resin having a space in between filled with e.g. a polyurethane foam. The use of a wooden material to reinforce the inner side of a single layer shell or to fill the space of a sandwich construction is well known.

It is realised that the forces and torque increase steeply with the increasing length of blades and that the strength and stiffness of the inner beam must be steeply increased as well for the known blades, as the shells only contribute minor to the overall load bearing properties of the blade.

In order for the shell to bear a substantial part of the forces of the inner beam, the above discussed structures that are reinforced with wooden material require for larger dimensions of blades a thickness of the wooden layer that would increase the weight of the blade significantly, thus causing increased stresses to the blade.

It is the object of the invention to provide a wind turbine blade having properties of laminated products, i.e. high strength in comparison with the amount of material and lower production cotsts compared to solid products, but where the strength compared to the costs of manufacturing the blade is highly increased compared to prior art blades.

DESCRIPTION OF THE INVENTION

This object is obtained by a blade, which blade over a substantial longitudinal part comprises a layer along an outer periphery of the cross-section of the blade a blade, said layer constituted by a plurality of pre-fabricated strips arranged in a sequence along the outer periphery of the blade By the term "a substantial longitudinal part" is understood a part extending over at least a third of the total length of the blade from tip to hub, preferably over at least half of the total length of the blade. According to a preferred embodiment, 60–85% of the total length, such as about 70%, comprises such layer.

Thereby, the optimal material properties may be obtained by combining different types of strips, such as pultruded fibrous composite strips comprising different fibres, such as carbon fibres, glass fibres and/or natural fibres, wooden strips, composite strips formed as hollow tubes etc. Each of the types of strips are much simpler, and thus cheaper, to manufacture than to form a whole blade, and the strips may be joint by suitable methods, such as by injection of resin or by vacuum infusion of resin.

According to the invention, a wind turbine blade may be obtained, which reduces the forces and torque on the inner beam. Furthermore, the resistance against tension and compression forces in a layer near the outer periphery of the shell provides the blade with an improved structural efficiency with respect to an edge-wise bending mode.

Accordingly, in a preferred embodiment, at least some of the pre-fabricated strips are made from pultruded fibrous composite material, such as carbon-resin.

Thereby, a construction is obtained with an excellent stiffness, but which is not prone to buckling. Thus, the inner structure of the blade may be made of a lighter construction, e.g. by replacing the commonly used inner beam of a square cross section with two lighter webs at the leading edge and the travelling edge, respectively.

The periphery layer may, in a preferred embodiment, be assembled by injection of resin or by vacuum infusion of resin. Use of resin infusion leads to a speedy, healthy and safe manufacturing process, leaving no or only very few voids in the resin. A limitation of the number of voids reduces subsequent finishing. A very little amount of the fibres in the blade is actually infused. The resin is mainly a glue rather than a matrix. This results in a structure being more tolerant to any possible voids.

According to one, preferred embodiment, the blade over a substantial longitudinal part comprises a layer along the outer periphery of its cross-section, wherein the layer at least partly is constituted by strips of a wooden material and strips of a fibrous composite material in an alternating sequence along the outer periphery.

Thereby, the excellent stiffness of fibrous composite materials and the high resistance against bulking of wooden materials is combined to achieve a shell with suitable properties in a cost-efficient manner.

An especially advantageous embodiment comprises at least some strips made from a wooden material, preferably plywood used as the wooden material, and natural fibre pultrusions, preferably carbon fibre pultrusions, as the fibrous composite material.

The advantages obtained by this embodiment are that the materials are compatible and both are having low thermal expansion coefficients. Both types of material work at similar low range of strains resulting in the possibility of stiffer blades compared to the weight of the blades. Also, natural fibres may be prone to buckling, and although wood is bulky, wood is not prone to buckling, thus also for this reason, the two types of material are very complementary.

The strips may in general be made from wood, laminated wood, pultrusions from any fibre man-made or natural with any resin, thermoset, thermoplastic, man-made or naturally derived, foam plastics, lightweight core materials in any proportion. At least some of the pre-fabricated strips are advantageously formed from a fibrous composite material. The fibres of the fibrous material may be any known fibre having suitable properties to reinforce the wood composite, such as carbon fibres, glass fibres, Kevlar fibres, natural fibres, e.g. from hemp or flax, coir fibres, etc. or any combination thereof.

As example, carbon has a higher strain to failure than wood. Carbon acts as stiffening additive but wood fails first. This has been taken advantage of in coupon testing to prove strength of carbon and wood separately. Adding carbon and thus the possibility of using thinner skins nay reduce skin buckling margins.

Carbon fibres are relatively expensive, however, wood is cheap and can cover the area of the blade incurring very low costs. Wood itself, however, produces thick inefficient skins in highly stressed blades. Carbon fibres combined with wood may produce thinner skins, which are structurally efficient and satisfying, Also, wood is highly defect tolerant. The percentage of the total cross-sectional area of the shell comprised of fibrous composite material is preferably within the range of 3% to 30% in the part of the blade having highest content of the fibrous material, more preferred within the range of 6% to 20%.

Likewise, the of the total cross-sectional area of the shell comprised of fibres is preferably within the range of 2% to 20%, more preferred within the range of 4% to 15%.

In a particularly preferred embodiment of the present invention, at least some of the strips are constituted by hollow tubes formed from a fibrous composite material. Thereby, material and weight is saved while advantageous structural properties are preserved.

At least some of the strips of the fibrous composite material are preferably pultrusions, i.e. strips made by pultruding mixture of fibres and a matrix material that is cured after pultrusion, such as a processable resin, e.g. vinyl ester. Thereby, a strip having straight fibres and a low void content is obtained. Also, a low content of resin may be obtained leading to little shrinkage and rapid curing.

It is thus advantageous that the pultrusions have a pultrusion direction substantially aligned with a longitudinal direction of the blade in which direction the properties of the fibres are required. However, pultrusion terminating joints are stress raisers, so particular attention is being given to these in structural element testing.

The fibrous composite material comprises advantageously a fibre volume fraction of 50% to 90%, preferably from 60% to 80%. In particular, the fibrous composite material may comprise a carbon fibre volume fraction of 50% to 90%, preferably from 60% to 80%.

According to a preferred embodiment at least some of the pre-fabricated strips are made from a wooden material as wooden materials are low in costs an light weight, and the material properties of the wooden material may be completed to form the required blade material properties by combining with strips of other material types, such as fibrous composite materials. The wooden material may be strips of wood, which if necessary are glued together in the longitudinal direction of the blade.

A preferred embodiment employs plywood, in particular unidirectional plywood as the wooden material because of the homogeneous material properties. Another type of wooden material that may be employed is comprised by wooden fibres held in a cured resin. Wood is seeing same direct stresses, so it is possible to use new joint patterns and glues using established design allowables, and still being confident of the structure of the wooden material.

The layer is, according to one embodiment, at least partly constituted by strips of a wooden material and strips of a fibrous composite material in a sequence along the outer periphery. The sequence may preferably be an alternating sequence of strips of a wooden material and strips of a fibrous composite material. The alternating sequence preferably ranges over only a part of the complete periphery of the blade.

It is advantageous that the layer discussed is part of a sandwich construction as discussed previously, i.e. is enclosed in an outer shell and an inner shell made from a fibrous composite material such as glass fibre web held by a cured synthetic resin.

Types of Specimens:

Minibeams—1-beam, 2.5 m long by 150 mm by 150 mm (25 mm thick flanges) with half scale skins. Includes pultrusion terminations, defects, wood joints. 6 m×1.2 m Aerofoil—Type A designed to fall in direct overstress, testing skins, leading and trailing edge joints. Type B specimen with relatively thin skins for buckling investigations. 31 m Blade—A blade built in the A131 mould with the same root fixings as the AL40 (72×M30 fixings), with skins built with a similar distribution of wood and carbon as AL40, double webs and similar leading edge joint.

| \multicolumn{3}{c}{Structural Element Testing} | | |
|---|---|---|
| Element | Test | Proving |
| Minibeams | 3 point bending static | Strength of skins, joints in wood and pultrusion terminations |
| 6 m aerofoil 'A' Thick skins | 4 point bending static | Leading edge joint, webs and joints in skin. |
| 6 m aerofoil 'B' Thin skins | 4 point bending static | Buckling theory with curved skins |
| 31 m Blade | Cantilever bending static edgewise | Stiffness, frequency, damping, (load to 1.35 max strain as AL40, distribution as A131). |
| | Cantilever bending static flatwise | As edgewise above but 1.5 max strain as AL40, distribution as A131. Stud ring bending (strain gauged) |
| | Cantilever bending fatigue flatwise | Accelerated fatigue regime. Targetted at 1 million cycles to simulate A140 lifetime strain cycling. |
| | Static flatwise to failure | Failure mode and limits |
| | Root fixing static pull out and fatigue | Confirmation of root fixing strength margins |

| \multicolumn{2}{c}{40 m Blade Test} | |
|---|---|
| Cantilever bending static edgewise | Stiffness, frequency, damping, proof load to 1.35 extreme. |
| Cantilever bending static flatwise | As edgewise above proof load to 1.35 extreme. Stud ring bending (strain gauged) |
| Cantilever bending fatigue flatwise | Fatigue regime. Targeted at 5 million cycles equivalent of life with 1.35 load factor. |
| Cantilever bending fatigue edgewise | Fatigue regime. Targeted at 5 million cycles equivalent of life with 1.35 load factor. |
| Static flatwise to failure | Failure mode and limits |

| \multicolumn{3}{c}{Coupon Testing} | | |
|---|---|---|
| Material | Test | Proving |
| Carbon Pultrusion | Tension/compression static & fatigue CRAG test | Carbon margins very high |
| Wood | Tension/compression static & fatigue AL type specimen | Wood joints perform as well or better than previous joint types |
| Carbon with wood | Static compression Std wood test | Carbon works as predicted with wood in lowest strength compressive stress |

The invention may incorporate a lightning protection system comprising two possibly replaceable lightning attractors, preferably close to the tip. One of the lightning attractors are placed on the windward side, and the other lightning attractor is placed on the leeward side. Both are connected to a width of aluminium mesh or similar material extending over the fibre reinforced area under the surface layer of gel coat of the blade, and are passed down to the root of the blade, where it is earthed.

A radio frequency, e.g. a radar signal, absorption medium may optionally be infused with the rest of the structure. It is also possible to embed optical fibres in the blade, either additional to the reinforcing fibres or as a substitute to the reinforcing fibres. Optical fibres may be used to measure loads on and within the surface of the blade during operation of the wind turbine.

Alternatively, resistance measurement of carbon fibres may be used to measure loads on or within the surface of the blade. Also, the carbon fibres used for measuring such loads may be one or more of the reinforcing fibres or may be carbon fibres additional to the reinforcing fibres and dedicated to measuring these loads.

BRIEF DESCRIPTION OF THE DRAWINGS

A preferred embodiment of the present invention is shown in the accompanying drawing, of which

DETAILED DESCRIPTION OF THE INVENTION

Figure 1:
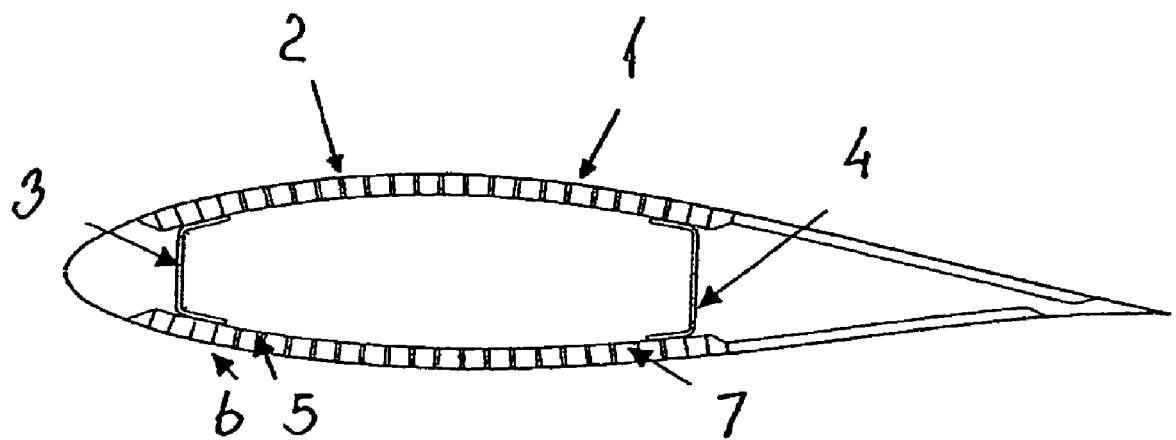
FIG. 1 is a cross-section of a blade having a layer comprised of strips of plywood in alternating sequence with strips of a fibre pultrusion.

The blade shown in cross-section in FIG. 1 has a layer comprised of 40×40 millimetre strips of birch plywood 1 in alternating sequence with 6×40 millimetre strips of a carbon fibre pultrusion 2. The layer 1,2 stretches along the central part of the blade between two C-beams 3,4 of glass fibre web and synthetic resin composite denoted the LE (leading edge) Web 3 and the TE (travelling edge) Web 4 and replacing the central inner beam discussed previously. The layer 1,2 is sandwiched between an inner layer and an outer layer 6 of glass epoxy skins that carry shear stress and promote the transverse stiffness of the blade. The space defined between the upper and lower shell thus constituted by the birch plywood 1 and the carbon fibre pultrusion 2, and the LE Web 3 and the TE Web 4 is filled with a balsa wood core 7.

Figure 2A:
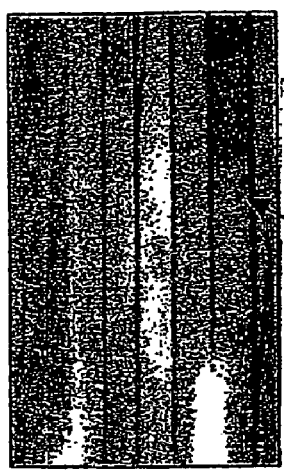
FIG. 2a is a cross-section of a blade similar to the blade of FIG. 1 having a different distribution along the periphery of the parts with pultrusion strips.
Figure 2B:
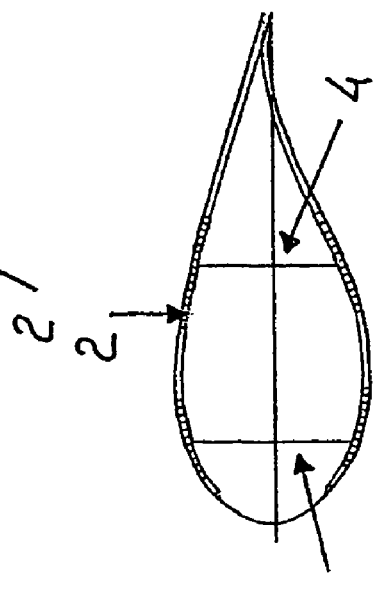
FIG. 2b shows a plane view of a blade similar to the blade shown in cross-section in FIG. 2a, thus having a similar distribution along the periphery of the parts with pultrusion strips.
Figure 2C:
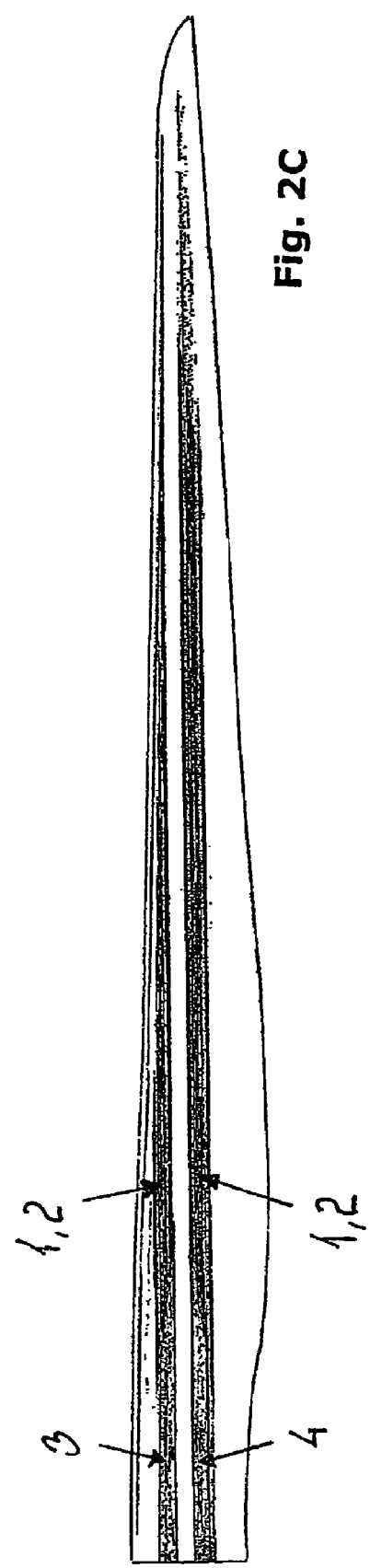
FIG. 2c is a photograph of the surface of the blade of FIG. 2a with the outer shell of composite material removed.

The blade shown in FIGS. 2a, 2b and 2c are similar to the one shown in FIG. 1 with the exception that the reinforcement of carbon fibre pultrusions 2 are situated near the areas of contact between the upper and the lower shell and the LE Web 3 and the TE Web 4, where the stress concentration is highest. In the embodiment shown, double web is used instead of a single web. This is to give sufficient buckling margin on the skins during compression. Also, the leading web reduces the leading edge joint shear load, allowing a smaller leading edge joint area. This is advantageous during manufacturing of the blade.

The technology is advantageous in that the addition of fibre pultrusions to a wood construction promotes the stiffness of the construction. The carbon fibre pultrusions are not used all along the blade length but only in the middle 70% where required by the stresses. The blade skin cross section may be up to 10% by area of carbon fibre pultrusion In the more highly stressed regions, dispersed throughout the wood composite in the shown embodiment. The skins are typically 60% of the thickness of the blade skins comprised purely by wood, which reduces weight and improves the structural efficiency in the critical edgewise bending mode. The outer and inner glass epoxy skins are manufactured with glass fibres oriented plus and minus 45 degrees to the longitudinal direction of the blade.

Pultrusions have the advantage of guaranteeing straight fibres and low void content in the carbon fibre composite itself. Furthermore, pultrusions have the advantage of speeding the blade infusion process as the fine carbon fibres would otherwise need significantly more time to infuse. The pultrusion has a high fibre volume fraction, about 70%, with a medium strength but highly processable resin, as example vinyl ester. Preferably, when manufacturing the blade, the resin is supplied with "peelply" on the two long sides, which is removed to produce a clean textured surface ensuring a good bond.

Figure 3:
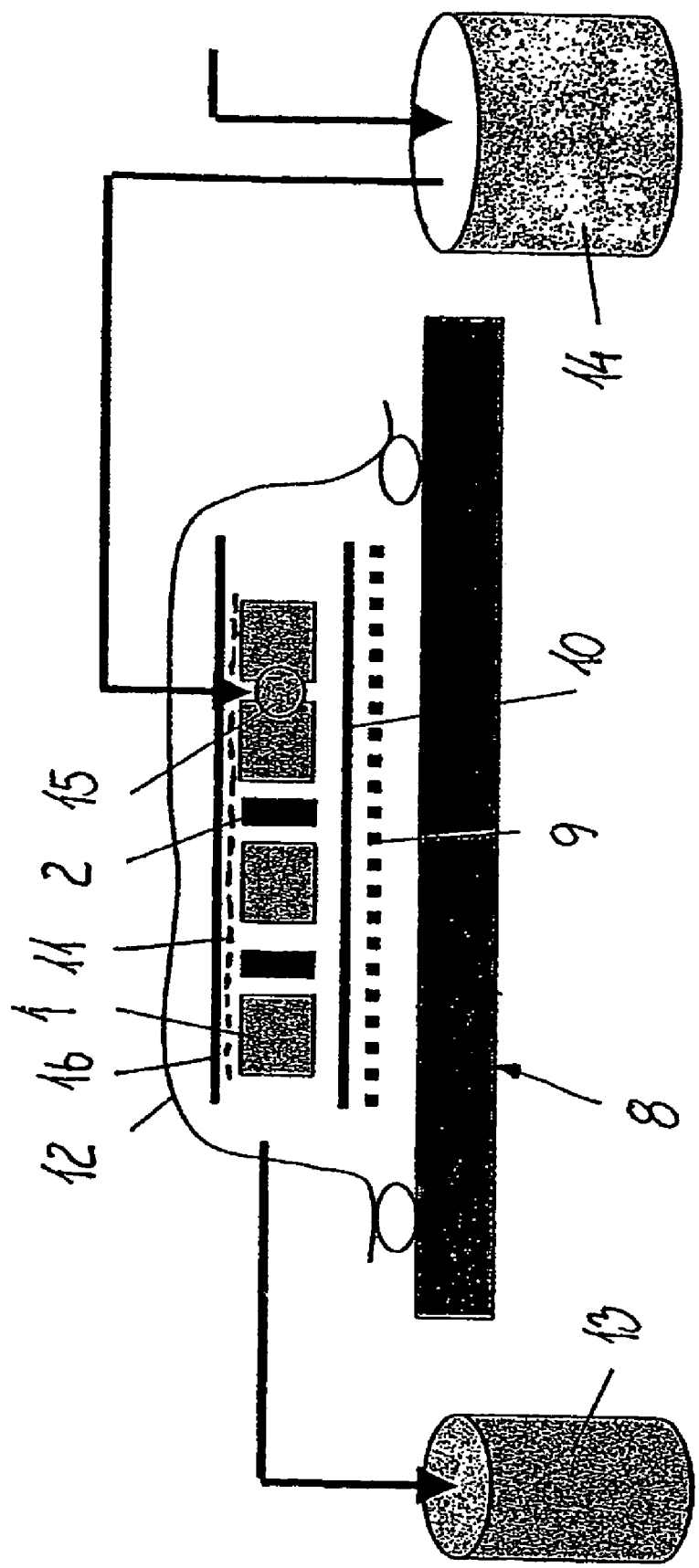
FIG. 3 illustrates the vacuum resin infusion process.

The manufacturing process of a shell of a blade shown in FIG. 3 comprises the steps of applying a gel coat (not shown) to a mould 8 followed by a transfer media 9 such as a transfer mesh, 45 degrees glass fibre web 10 and epoxy (not shown) to the mould to create the outer glass epoxy skin. Hereafter the wood and pultrusion strips 1,2 are positioned and a metal mesh 11 such as an aluminium mesh for the lightning protection is then applied. The shell is then wrapped in a container, in the process shown a vacuum bag 12, which is evacuated by exterior means 13. Then, resin is injected from a resin reservoir 14 through resin channels 15 formed between adjacent strips, from which the resin spreads throughout the construction driven by the vacuum. A general resin used for Infusion is Prime 20 from SP Systems. After curing of the resin, an inner glass epoxy skin 16 is manufactured on top of the wood and pultrusion strips 1,2.

The invention claimed is:

1. A blade for a wind turbine, wherein at least a third of the total length, measured from tip to hub, of said blade comprises a layer along an outer periphery of the cross-section of said blade, wherein the layer is at least partly constituted by a number of pre-fabricated strips arranged in a sequence along the outer periphery, the pre-fabricated strips being arranged side-by-side to form connections between adjacent strips said connections are oriented substantially orthogonal to the surface of the layer in a plane orthogonal to the length of the blade, wherein at least one of the pre-fabricated strips is formed from a fibrous composite material.

2. A blade according to claim 1, wherein the strips of the outer layer are joined by means of resin infusion.

3. A blade according to claim 2, wherein the strips of the outer layer are joined by means of vacuum infusion of a resin.

4. A blade according to claim 1, wherein at least some of the pre-fabricated strips are constituted by hollow tubes formed from a fibrous composite material.

5. A blade according to claim 4, wherein at least some of the pre-fabricated strips of the fibrous composite material are pultrusions.

6. A blade according to claim 1, wherein the fibrous composite material comprises a fibre volume fraction from 50% to 90%.

7. A blade according to claim 6, wherein the fibrous composite material comprises a fibre volume fraction of from 60% to 80%.

8. A blade according to claim 1, wherein the fibrous composite material comprises a carbon fibre volume fraction from 50% to 90%.

9. A blade according to claim 8, wherein the fibrous composite material comprises a fibre volume fraction of from 60% to 80%.

10. A blade for a wind turbine, wherein at least a third of the total length, measured from tip to hub, of said blade comprises a layer along an outer periphery of the cross-section of said blade, wherein the layer is at least partly constituted by a number of pre-fabricated strips arranged in a sequence along the outer periphery, at least some of the strips having elongated strip cross-sections in a plane orthogonal to the length of the blade, at least some of these strips being arranged with a short side of the strip cross-section along the outer periphery of the cross-section of the blade, and at least some of these strips being arranged with a long side of the strip cross-section substantially orthogonal to the outer periphery of the cross-section of the blade.

11. A blade for a wind turbine, wherein at least a third of the total length, measured from tip to hub, of said blade comprises a layer along an outer periphery of the cross-section of said blade, wherein the layer is at least partly constituted by a number of strips arranged in a sequence along the outer periphery the strips being arranged to side-by-side to form connections between adjacent strips, said connections are oriented substantially orthogonal to the surface of the layer in a plane orthogonal to the length of the blade.

12. A blade according to claim 11, wherein the strips are pultruded, the pultruded strips have a pultrusion direction substantially aligned with a longitudinal direction of the blade.

13. A blade according to claim 11, wherein the layer is at least partly constituted by a number of strips made from a wooden material arranged in a sequence along the outer periphery.

14. A blade according to claim 13, wherein the wooden material is plywood.

15. A blade according to claim 13, wherein the wooden material is comprised by wooden fibres held in a cured resin.

16. A blade according to claim 13, wherein the layer is at least partly constituted by strips of a wooden material and strips of a fibrous composite material in a sequence along the outer periphery.

17. A blade according to claim 16, wherein said sequence is an alternating sequence of strips of a wooden material and strips of a fibrous composite material.

18. A blade according to claim 11, wherein said layer is enclosed in an outer shell and an inner shell made from a fibrous composite material.

19. A blade according to claim 11, wherein load measuring fibres are enclosed in at least one of an outer shell and an inner shell.

20. A blade according to claim 19, wherein the load measuring fibres are optical fibres being additional to reinforcing fibres.

21. A blade according to claim 19, wherein the load measuring fibres are carbon fibres being additional to reinforcing fibres.

22. A blade according to claim 19, wherein the load measuring fibres are optical fibres.

23. A blade according to claim 19, wherein the load measuring fibres are carbon fibers.

24. A blade according to claim 11, further comprising lightning protection means, the lightning protection means including lightning attractors incorporated into either one or both of the shells.

25. A blade according to claim 24, wherein the lightning attractors are connected to a width of metal mesh or similar material extending over the fibre reinforced area of the shells.

26. A blade according to claim 11, further comprising a radio frequency absorption medium, the radio frequency absorption medium is incorporated into either one or both of the shells.

27. A blade according to claim 11, wherein the pultruded strips are pre-fabricated.

28. A blade according to claim 11, wherein the pultruded strips are of a fibrous composite material.

29. A method for manufacturing a pre-fabricated strip for a blade, the blade comprising a layer material arranged along an outer periphery of a cross-section of the blade, the method comprising:

assembling at least two individual materials to constitute the pre-fabricated strip;

selecting at least one of the at least two individual materials among fibrous composite materials;

inserting the assembled at least two individual material into a container;

evacuating the container so as to infuse a curing resin to allow the resin to cure; and taking out from the container the assembled and cured strip which is fabricated.

30. A method according to claim 29, wherein the container is a bag.

31. A method for manufacturing a shell for a blade, the shell comprising a layer material arranged along an outer periphery of a cross-section of the shell, the layer comprising pre-fabricated strips, the method comprising:

applying a surface material to a mold for the blade;

assembling at least two individual materials to constitute the pre-fabricated strips;

selecting at least one of the at least two individual materials among fibrous composite materials;

positioning the at least two individual material in the mold of the blade;

inserting the applied individual materials and other materials into a container;

evacuating the container so as to infuse a curing resin to allow the resin to cure; and de-molding from the mold the shell thus fabricated.

32. A method according to claim 31, wherein the surface material is a gel coat.

33. The method of claim 31, further comprising:

applying at least one of a metal mesh, a glass fibre mesh and a transfer media to the mold of the blade.

\* \* \* \* \*